(12) United States Patent
Kaneta et al.

(10) Patent No.: US 12,519,886 B2
(45) Date of Patent: Jan. 6, 2026

(54) RESCUE PRIORITY DETERMINATION DEVICE

(71) Applicant: SUBARU CORPORATION, Tokyo (JP)

(72) Inventors: Takuya Kaneta, Tokyo (JP); Chooi Chuan Sim, Tokyo (JP); Yuta Goto, Tokyo (JP); Iyo Hashimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 644 days.

(21) Appl. No.: 17/941,517

(22) Filed: Sep. 9, 2022

(65) Prior Publication Data

US 2023/0086328 A1    Mar. 23, 2023

(30) Foreign Application Priority Data

Sep. 17, 2021 (JP) .................. 2021-152212

(51) Int. Cl.
    *H04M 3/51* (2006.01)
    *H04W 4/029* (2018.01)
    *H04W 4/90* (2018.01)

(52) U.S. Cl.
    CPC ......... *H04M 3/5116* (2013.01); *H04W 4/029* (2018.02); *H04W 4/90* (2018.02)

(58) Field of Classification Search
    CPC ....... H04M 3/5116; H04M 2203/2038; H04W 4/029; H04W 4/90
See application file for complete search history.

(56) References Cited

U.S. PATENT DOCUMENTS 4,369,426 A * 1/1983 Merkel ................... G08G 1/205
    340/904
2020/0331553 A1* 10/2020 Kurata .................... G01G 19/44

FOREIGN PATENT DOCUMENTS

CN      109089240 A * 12/2018
JP      2002-56479 A    2/2002

* cited by examiner

*Primary Examiner* — Marcos L Torres
(74) *Attorney, Agent, or Firm* — TROUTMAN PEPPER LOCKE LLP

(57) ABSTRACT

The rescue priority determination device comprises a driving condition information obtainer, a location information obtainer, and a rescue priority determinator. The driving condition information obtainer and the location information obtainer respectively are configured to obtain driving condition information and location information of a vehicle that made an emergency call, and the rescue priority determinator comprises one or more processors that is configured to determine the rescue priority level for the vehicle that made the emergency call based on the driving condition information and the location information. The rescue priority determinator determines that the need for rescue for the vehicle that made the emergency call is high and raises the rescue priority level based on determining that the vehicle that made the emergency call is at a standstill and that the location information of the vehicle that made the emergency call has changed.

17 Claims, 12 Drawing Sheets

| VEHICLE INFORMATION | | RESCUE PRIORITY |
|---|---|---|
| VEHICLE SPEED IS ZERO | AMOUNT OF LOCATION CHANGE | |
| ○ | CL | HIGH |
| ○ | CH | HIGH |

FIG.6

| VEHICLE INFORMATION | | RESCUE REQUEST INFORMATION | | |
|---|---|---|---|---|
| VEHICLE SPEED IS ZERO | AMOUNT OF LOCATION CHANGE | RESCUE PRIORITY | TYPE OF ACCIDENT | RESCUE ORGANIZATION |
| ○ | CL | HIGH | MULTIPLE COLLISION | POLICE, FIRE DEPARTMENT |
| ○ | CH | HIGH | DISASTER | FIRE DEPARTMENT, POLICE, LOCAL GOVERNMENT |

FIG.7

| VEHICLE INFORMATION ||  RESCUE PRIORITY |
|---|---|---|
| VEHICLE SPEED IS ZERO | INERTIA FORCE GENERATION TIME | |
| ○ | OL | HIGH |
| ○ | OH | HIGH |

FIG.13

| VEHICLE INFORMATION || RESCUE REQUEST INFORMATION |||
|---|---|---|---|---|
| VEHICLE SPEED IS ZERO | INERTIA FORCE GENERATION TIME | RESCUE PRIORITY | TYPE OF ACCIDENT | RESCUE ORGANIZATION |
| ○ | OL | HIGH | MULTIPLE COLLISION | POLICE, FIRE DEPARTMENT |
| ○ | OH | HIGH | DISASTER | FIRE DEPARTMENT, POLICE, LOCAL GOVERNMENT |

FIG.14

RESCUE PRIORITY DETERMINATION DEVICE

CROSS-REFERENCE TO RELATED APPLICATION

The present application claims priority from Japanese Patent Application No. 2021-152212 filed on Sep. 17, 2021, the entire contents of which are hereby incorporated by reference.

FIELD

The disclosure relates to a rescue priority determination device.

BACKGROUND

An emergency call system is known that transmits the vehicle's location and other information to a dedicated reception center via a network etc., either automatically or by simple manual operation by the occupants, in the event of a traffic accident or an in-vehicle emergency.

In this type of system, it is customary for multiple emergency calls to be handled in the received order, or handled by multiple operators at the reception center.

For this reason, when many calls are received in a short period of time, the order of rescue may be determined by the judgment of each operator, which may result in the subject who should be rescued with the highest priority being put on the back burner.

To address this issue, for example, Japanese Unexamined Patent Application Publication (JP-A) No. 2002-056479 discloses an emergency response system that makes an emergency call to the reception center from the side where the emergency occurred when an emergency occurs. This emergency response system comprises, on the side where the emergency occurred, a generator that generates the outputs depending on the extent of the emergency when the emergency occurred, a determinator that determines the degree of the emergency based on the output from the generator, and a transmitter that transmits a signal indicating the determination result of the determinator to the reception center.

Further, the emergency response system comprises, on the reception center side, a receiver that receives signals containing information on the extent of the emergency transmitted from the side where emergency occurred, a recognizer that recognizes the degree of the emergency from the signals received by the receiver, and a priority determinator that determines the priority order in which to respond, taking into account the degree of the emergency recognized by the recognizer and at least one of the following information: traffic congestion around the emergency site; the road type; the distance from the emergency site to the fire station; or the time of the call.

SUMMARY

One or more embodiments of the present disclosure proposes a rescue priority determination device having a driving condition information obtainer configured to obtain driving condition information of a vehicle that made an emergency call; a location information obtainer configured to obtain location information of the vehicle that made the emergency call; a rescue priority determinator configured to determine rescue priority level for the vehicle that made the emergency call based on the driving condition information obtained by the driving condition information obtainer and the location information of the vehicle obtained by the location information obtainer, in which the rescue priority determinator comprises one or more processors and one or more memories communicably coupled to the one or more processors, and the one or more processors are configured to determine that the vehicle that made the emergency call is in high need of rescue and raise the rescue priority level based on determining that the vehicle that made the emergency call is at a standstill and that the location information of the vehicle that made the emergency call has changed.

One or more embodiments of the present disclosure proposes a rescue priority determination device include a driving condition information obtainer configured to obtain driving condition information of a vehicle that made an emergency call; an inertia force detector configured to detect inertia force generated when a moving speed of the vehicle that made the emergency call changes; and a rescue priority determinator configured to determine rescue priority level for the vehicle that made the emergency call based on the driving condition information obtained by the driving condition information obtainer and the inertia force detected by the inertia force detector, in which the rescue priority determinator comprises one or more processors and one or more memories communicably coupled to the one or more processors, and the one or more processors are configured to determine that the vehicle that made the emergency call is in high need of rescue and raise the rescue priority level based on determining that the driving condition of the vehicle that made the emergency call is at a standstill and the inertia force generated when the moving speed of the vehicle that made the emergency call is changing is detected.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 6 illustrates an example of information output to the rescue request information generator by the rescue priority determinator in the rescue priority determination device according to the first embodiment of the disclosure.

FIG. 7 illustrates an example of a database stored in a memory unit in the rescue priority determination device according to the first embodiment of the disclosure.

FIG. 13 illustrates an example of information output to the rescue request information generator by the rescue priority determinator in the rescue priority determination device according to the second embodiment of the disclosure.

FIG. 14 illustrates an example of a database stored in a memory unit in the rescue priority determination device according to the second embodiment of the disclosure.

DETAILED DESCRIPTION

In JP-A No. 2002-056479, only three types of information indicating the extent of the emergency (severe, moderate, and minor) are presented from the emergency side to the reception center, and the decision on the extent of the emergency is left to the decision of the emergency side such as an occupant of a vehicle. This means that the information indicating the degree of the emergency is dominated by subjective factors and lacks objectivity based on facts, which in turn undermines the credibility of the priority information determined based on this information.

Therefore, in view of the above-mentioned issue, it is desirable for the disclosure to provide a rescue priority determination device that determines the rescue priority based on the condition of a vehicle determined based on objective information of the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The rescue priority determination device 1 according to the present embodiment will be described with reference to FIGS. 1 to 7.

Figure 1:
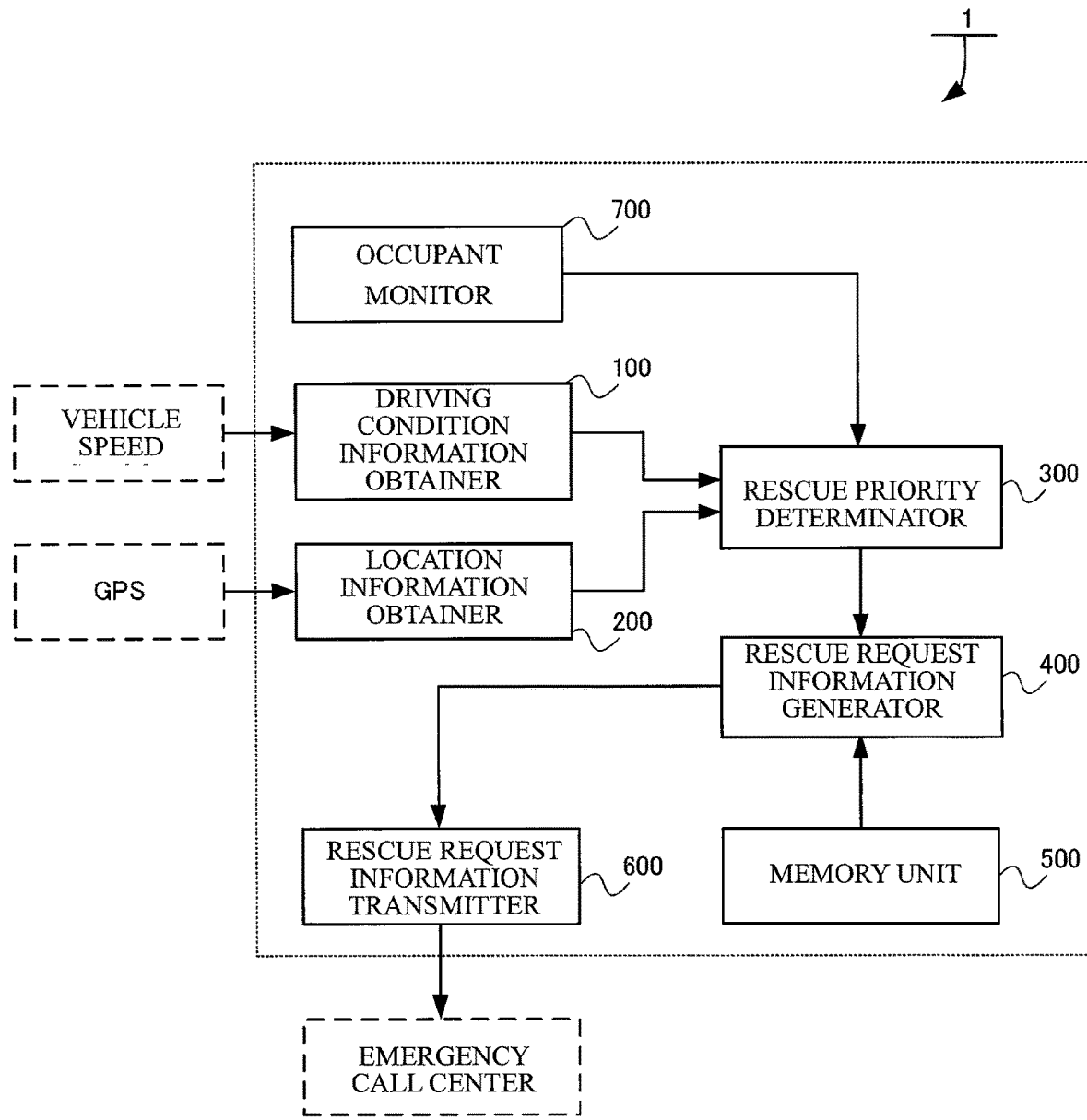
FIG. 1 illustrates the configuration of a rescue priority determination device according to a first embodiment of the disclosure.

As illustrated in FIG. 1, a rescue priority determination device 1 according to this embodiment comprises a driving condition information obtainer 100, a location information obtainer 200, a rescue priority determinator 300, a rescue request information generator 400, a memory unit 500, a rescue request information transmitter 600, and an occupant monitor 700.

The driving condition information obtainer 100 obtains driving condition information of a vehicle that made an emergency call.

For example, the driving condition information obtainer 100 may obtain the driving condition information of a vehicle that made the emergency call from a sensor output of a vehicle speed sensor of the vehicle.

In this embodiment, the driving condition information obtainer 100 obtains information about whether the vehicle speed of the vehicle that made the emergency call has reached zero before/after the emergency call, in a period including the time when the vehicle made the emergency call.

The vehicle speed sensor of the vehicle may be one or more vehicle wheel speed sensors each of which is configured to detect a rotation speed of a wheel of the vehicle that made the emergency call. The vehicle speed of the vehicle that made the emergency call being zero may mean the rotation speed of the each of wheels of the vehicle being zero or substantially zero. In a state where the rotation speed of the each of wheels of the vehicle being zero or substantially zero, the vehicle doesn't travel.

Therefore, after a reporting trigger described below is detected, the driving condition information of the vehicle is periodically output to the rescue priority determinator 300 described below.

The location information obtainer 200 obtains location information of the vehicle that made the emergency call.

For example, the location information obtainer 200 obtains the location information of the vehicle that made the emergency call from latitude and longitude information output by the GPS.

In this embodiment, chronological location information of the vehicle that made the emergency call is obtained based on the location information obtained by the location information obtainer 200.

Therefore, after the reporting trigger described below is detected, the location information obtainer 200 periodically outputs the location information of the vehicle that made the emergency call to the rescue priority determinator 300 described below.

The rescue priority determinator 300 stores the location information obtained by the location information obtainer 200 in chronological order in a memory described below.

The rescue priority determinator 300 determines the rescue priority for the vehicle that made the emergency call based on the driving condition information obtained by the driving condition information obtainer 100 and the location information of the vehicle that made the emergency call obtained by the location information obtainer 200.

For example, when the driving condition information obtained by the driving condition information obtainer 100 indicates that the vehicle that made the emergency call is at a standstill, and the location information of the vehicle has changed, the rescue priority determinator 300 determines that the vehicle that made the emergency call is in high need of rescue and raises the rescue priority level for the vehicle.

The rescue priority determinator 300 outputs the determined rescue priority level for the vehicle that made the emergency call to the rescue request information generator 400, which is described later.

The rescue request information generator 400 generates rescue request information according to the amount of change in the location information of the vehicle that made the emergency call when the rescue priority determined by the rescue priority determinator 300 is high.

For example, if the amount of the change in the location information of the vehicle that made the emergency call is greater than a predetermined amount of change (predetermined amount), the rescue request information generator 400 generates first rescue request information that is issued when, for example, a disaster has occurred and the vehicle that made the emergency call is determined to be involved in the disaster.

If the amount of the change in the location information of the vehicle that made the emergency call is smaller than a predetermined amount of change (predetermined amount), the rescue request information generator 400 generates second rescue request information that is issued when, for example, a multiple collision accident has occurred and the vehicle that made the emergency call is determined to be involved in the multiple collision accident.

The predetermined amount of change (predetermined amount) is, for example, a threshold value to distinguish between the above-mentioned disaster and multiple collision accident. The threshold value is, for example, a value of a few meters.

The memory unit 500 is configured of RAM, etc., and stores, for example, a database that is used for generating the rescue request information in the rescue request information generator 400.

The database illustrated in FIG. 7 can be the example of the database.

In the database illustrated in FIG. 7, vehicle information and rescue request information are linked, and the rescue request information includes the rescue priority, accident type, and rescue organization information.

The rescue request information transmitter 600 transmits the rescue request information generated by the rescue request information generator 400 to, for example, an emergency call center.

In case a rescue request has already been made, for example, when there is a change in the rescue priority level in the rescue priority determinator 300, the rescue request information generated by the rescue request information generator 400 is newly sent to, for example, the emergency call center.

The occupant monitor 700 monitors one or more occupants of the vehicle.

In one example, the occupant monitor 700 monitors the presence or absence, behavior, vital status, etc. of the one or more occupants in the vehicle using an imaging device or millimeter wave radar.

The occupant monitor information monitored by the occupant monitor 700 is output to the rescue priority determinator 300.

Figure 2:
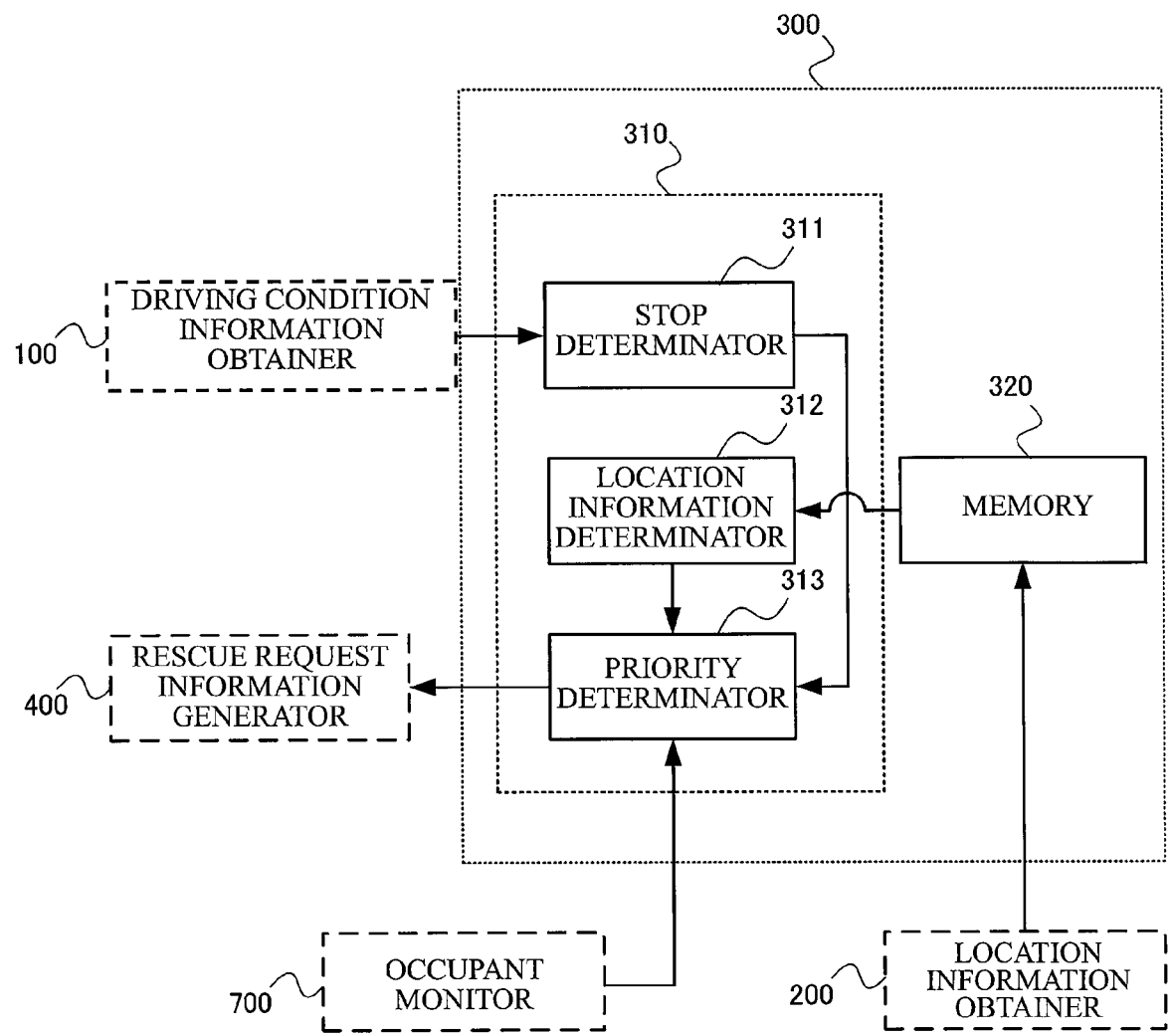
FIG. 2 illustrates the configuration of a rescue priority determinator according to the first embodiment of the disclosure.

As illustrated in FIG. 2, the rescue priority determinator 300 according to this embodiment comprises a processor 310 and a memory 320.

The processor 310 controls the entire rescue priority determinator 300 according to a control program stored in the memory 320 described below.

Further, in the present embodiment, in particular, functions of components such as a stop determinator 311, a location information determinator 312, and a priority determinator 313, which will be described later.

The memory 320 has ROM (Read Only Memory), RAM (Random Access Memory), etc. The ROM stores, for example, the above-mentioned control program, etc., and the RAM stores, for example, various data.

In the present embodiment, for example, the location information input from the location information obtainer 200 is stored in the RAM in chronological order.

As illustrated in FIG. 2, the processor 310 includes a stop determinator 311, a location information determinator 312, and a priority determinator 313.

The vehicle stop determinator 311 determines whether the vehicle that made the emergency call is stopped based on the information obtained from the driving condition information obtainer 100.

For example, the vehicle stop determinator 311 determines that the vehicle that made the emergency call is stopped when the vehicle stop determinator 311 receives information which represents that the vehicle speed detected by the vehicle speed sensor is zero from the driving condition information obtainer 100.

If the stop determinator 311 determines that the vehicle that made the emergency call is stopped, the stop determinator 311 outputs the information indicating that the vehicle is stopped to the priority determinator 313, which is described below.

The location information determinator 312 sequentially determines the amount of change in the location information of the vehicle that made the emergency call from the location information of the vehicle which is chronologically stored in the memory 320.

The amount of change in the location information of the vehicle determined by the location information determinator 312 is sequentially output to the priority determinator 313, which is described below.

The priority determinator 313 determines the rescue priority level based on the determination results of the stop determinator 311, the amount of change in the location information of the vehicle that made the emergency call that is sequentially received from the location information determinator 312, and the information that is obtained from the occupant monitor 700 and that includes information regarding the presence or absence of the one or more occupants in the vehicle (regarding whether there is no occupant in the vehicle).

The determination result of the rescue priority level by the priority determinator 313 is output to the rescue request information generator 400.

The process of the rescue priority determination device 1 according to the present embodiment will be described with reference to FIGS. 3 to 7.

Figure 3:
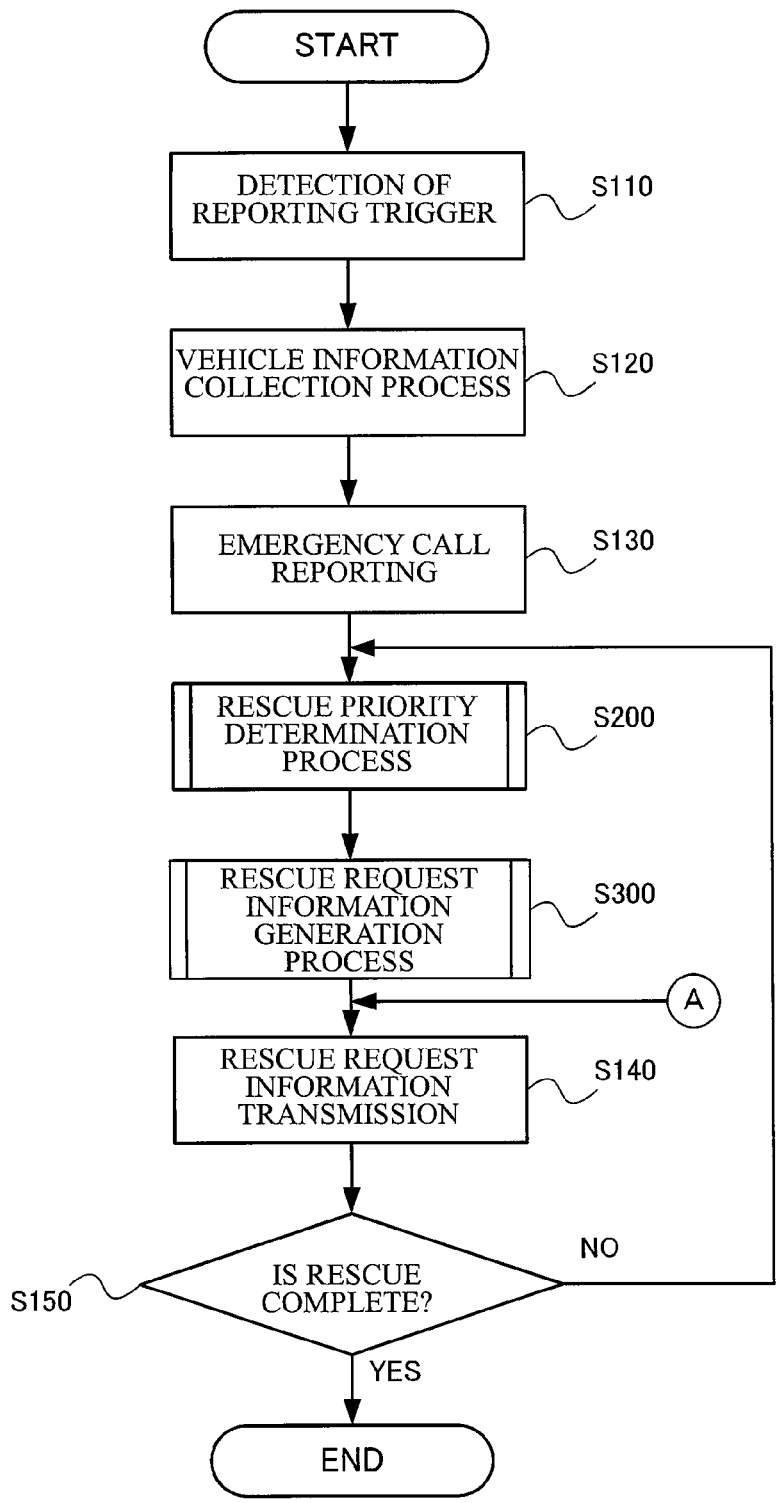
FIG. 3 illustrates a processing flow of the rescue priority determination device according to the first embodiment of the disclosure.

As illustrated in FIG. 3, the rescue priority determination device 1 detects, for example, the reporting trigger made automatically or made manually by the one or more occupants of the vehicle (step S110).

For example, in the manual case, the rescue priority determination device 1 detects the reporting trigger by operation of a reporting trigger switch by the one or more occupants. In the automatic case, the rescue priority determination device 1 detects the reporting trigger if a predetermined condition is satisfied.

When the rescue priority determination device 1 detects the reporting trigger, the rescue priority determination device 1 executes a vehicle information collection process to collect vehicle information of the vehicle (step S120).

In one example, the rescue priority determination device 1 collects data from the vehicle speed sensor and latitude and longitude information from the GPS, via the driving condition information obtainer 100 and the location information obtainer 200.

The rescue priority determination device 1 then reports the emergency call to the emergency call center (step S130).

After reporting the emergency call, the rescue priority determination device 1 periodically collects the vehicle information and continues to transmit the collected vehicle information to, for example, the emergency call center.

Next, the rescue priority determination device 1 executes a rescue priority determination process to determine the rescue priority level (step S200).

The details of the rescue priority determination process (step S200) will be described below.

Furthermore, the rescue priority determination device 1 executes a rescue request information generation process to generate rescue request information (step S300).

The details of the rescue request information generation process (step S300) will be described below.

After completing the rescue request information generation process (step S300), the rescue priority determination device 1 transmits the generated rescue request information to, for example, the emergency call center (step S140) and determines whether the rescue is complete (step S150).

If the rescue priority determination device 1 determines that the rescue is complete ("YES" in step S150), the rescue priority determination device 1 terminates the series of processes.

On the other hand, if the rescue priority determination device 1 determines that the rescue is not complete ("NO" in step S150), the rescue priority determination device 1 moves the process to step S200 to repeat, until the rescue is complete, executing the rescue priority determination process (step S200), the rescue request information generation process (step S300) based on the vehicle information which is most recently collected, and the process of transmitting the generated rescue request information to, for example, the emergency call center (step S140).

The rescue priority determination process in the rescue priority determination device 1 according to the present embodiment will be described with reference to FIGS. 4 and 6.

Figure 4:
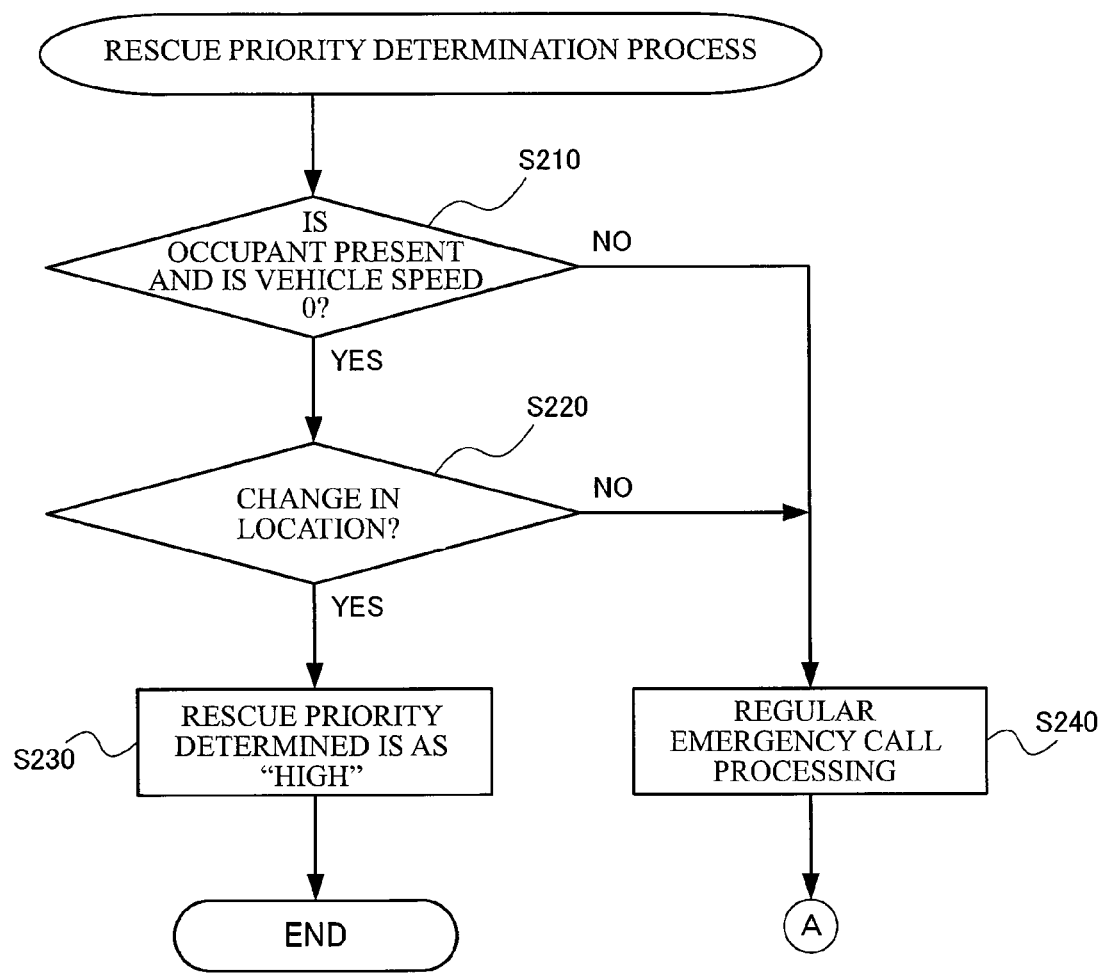
FIG. 4 illustrates a processing flow of a rescue priority determination process in the rescue priority determination device according to the first embodiment of the disclosure.

As illustrated in FIG. 4, based on the result of the determination by the stop determinator 311 and the information obtained from the occupant monitor 700, including the information on the presence or absence of the one or more occupants, the priority determinator 313 determines whether, for example, the one or more occupants are present in the vehicle that made the emergency call and whether the vehicle speed of the vehicle is zero (step S210).

If the priority determinator 313 determines that the one or more occupants are present in the vehicle and that the vehicle speed of the vehicle is zero ("YES" in step S210), the priority determinator 313 then determines whether there has been a change in the location of the vehicle that made the emergency call from the amount of change in the location information of the vehicle which is sequentially input from the location information determinator 312 (step S220).

If the priority determinator 313 determines that there has been a change in the location of the vehicle that made the emergency call ("YES" in step S220), the priority determinator 313 determines the rescue priority to be "high" based on a data table illustrated in FIG. 6 and ends the process (step S230).

The priority determinator 313 outputs the determination result including the rescue priority level linked with the vehicle information to the rescue request information generator 400, as illustrated in FIG. 6.

On the other hand, if the priority determinator 313 determines that there are the one or more occupants in the vehicle that made the emergency call and that the vehicle speed of the vehicle that made the emergency call is not zero ("NO" in step S210) or if the priority determinator 313 determines that the location of the vehicle that made the emergency call has not changed ("NO" in step S220), the priority determinator 313 processes the emergency call from the vehicle as a regular emergency call (step S240).

The rescue priority determination device 1 then moves the process to step S140.

The rescue request information generation process in the rescue priority determination device 1 according to the present embodiment will be described with reference to FIGS. 5 and 7.

Figure 5:
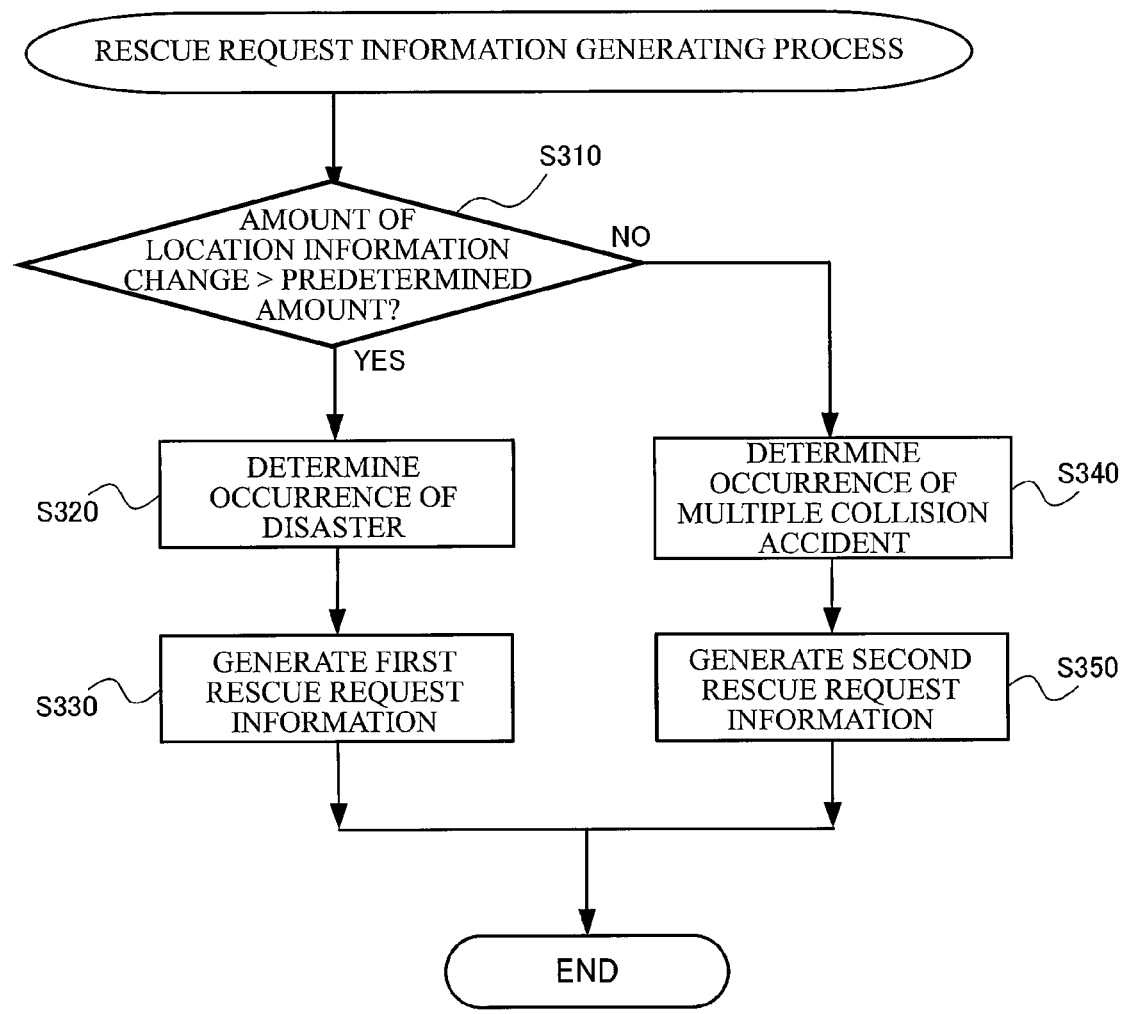
FIG. 5 illustrates a processing flow of a rescue request information generation process in the rescue priority determination device according to the first embodiment of the disclosure.

As illustrated in FIG. 5, the rescue request information generator 400 determines whether the change in the location information of the vehicle that made the emergency call is greater than a predetermined amount based on the information input from the priority determinator 313 (step S310).

If the rescue request information generator 400 determines that the amount of change in the location information of the vehicle that made the emergency call is greater than the predetermined amount based on the information input from the priority determinator 313 ("YES" in step S310), the rescue request information generator 400 determines that a disaster has occurred (step S320), for example, and generates the first rescue request information (step S330).

The rescue priority determination device 1 then moves the process to step S140.

On the other hand, if the rescue request information generator 400 determines that the amount of change in the location information of the vehicle that made the emergency call is equal to or smaller than the predetermined amount based on the information input from the priority determinator 313 ("NO" in step S310), the rescue request information generator 400 determines that a multiple collision accident has occurred (step S340), for example, and generates the second rescue request information (step S350).

The rescue priority determination device 1 then moves the process to step S140.

As described above, the rescue priority determination device 1 according to this embodiment comprises the driving condition information obtainer 100 that obtains driving condition information of the vehicle that made the emergency call, the location information obtainer 200 that obtains location information of the vehicle, and the rescue priority determinator 300 that determines the rescue priority for the vehicle based on the driving condition information obtained by the driving condition information obtainer 100 and the location information of the vehicle obtained by the location information obtainer 200.

If the vehicle that made the emergency call is at a standstill and the location information of the vehicle that made the emergency call has changed, the rescue priority determinator 300 determines that the vehicle that made the emergency call is in high need of rescue and raises the rescue priority level for the vehicle.

In other words, if the vehicle that made the emergency call is at a standstill and the location information of the vehicle that made the emergency call changes, there is a high possibility that the vehicle that made the emergency call was involved in some kind of accident or disaster.

Therefore, when the vehicle that made the emergency call is at a standstill and the location information of the vehicle that made the emergency call has changed, the rescue priority determinator 300 determines that the vehicle is in high need of rescue and raises the rescue priority for the vehicle. Accordingly, the rescue priority level can be determined based on the condition of the vehicle that made the emergency call as determined with objective information of the vehicle that made the emergency call.

The driving condition information obtainer 100 in the rescue priority determination device 1 according to this embodiment obtains driving condition information of the vehicle that made the emergency call from the vehicle speed sensor, and the rescue priority determinator 300 determines that the driving condition of the vehicle that made the emergency call is at a standstill when the information from the vehicle speed sensor obtained in the driving condition information obtainer 100 indicates that the vehicle speed of the vehicle is zero.

In other words, even if a foot brake or a side brake of the vehicle is detected as being activated, it is not necessarily possible to accurately determine whether there is a change in the location of the vehicle that made the emergency call based solely on external force from outside of the vehicle that made the emergency call.

That is, by detecting that the vehicle speed is zero using information from the vehicle speed sensor, it is possible to clearly detect that the vehicle that made the emergency call has experienced a change in location due to the external force.

The rescue priority determination device 1 has the occupant monitor 700 that monitors the one or more occupants in the vehicle that made the emergency call. When the vehicle that made the emergency call is at a standstill, the location information of the vehicle that made the emergency call has changed, and the one or more occupants are detected in the vehicle that made the emergency call, the rescue priority determinator 300 determines that the vehicle that made the emergency call is in high need of rescue and raises the rescue priority level for the vehicle that made the emergency call.

In other words, detecting the presence or absence of the one or more occupants by the occupant monitor 700 in a situation where there is a high possibility that the vehicle that made the emergency call is involved in some kind of accident or disaster allows a more accurate determination of the need for rescue.

If the occupant monitor 700 includes an imaging device or millimeter wave radar etc., the occupant monitor 700 can also detect behavior and vital data etc. of each of the one or more occupant in the vehicle. Thereby, the rescue priority determination device 1 further enables accurate determination of the urgency of the rescue.

The rescue priority determination device 1 according to this embodiment includes the rescue request information generator 400 and the rescue request information transmitter 600. The rescue request information generator 400 generates the rescue request information according to the amount of change in the location information of the vehicle that made the emergency call when the rescue priority level determined by the rescue priority determinator 300 is high. The rescue request information transmitter 600 transmits the rescue request information generated by the rescue request information generator 400 to the emergency call center. The rescue request information generator 400 generates the first rescue request information when the amount of the change in the location information of the vehicle is greater than the predetermined amount, and generates the second rescue request information when the amount of the change in the location information of the vehicle is smaller than the predetermined amount of change (predetermined amount).

In other words, if the rescue priority determined by the rescue priority determinator 300 is high and the amount of the change in the location information of the vehicle that made the emergency call is greater than the predetermined amount, the vehicle is likely to be involved in a disaster etc. Accordingly, the rescue request information generator 400 generates the first rescue request information to request rescue to, for example, the fire department which is the most appropriate organization to which the general public can request rescue. If the rescue priority determined by the rescue priority determinator 300 is high and the change in the location information of the vehicle is smaller than the predetermined amount, the vehicle is likely involved in a multiple collision or other accident. Accordingly, the rescue request information generator 400 generates the second rescue request information to request rescue to, for example, the police which is the most appropriate organization to which the general public can request rescue.

Therefore, it is possible to determine the rescue priority based on the condition of the vehicle determined with objective information of the vehicle, and to request rescue to an appropriate rescue organization.

The rescue priority determination device 1A according to the present embodiment will be described with reference to FIGS. 8 to 14.

Figure 8:
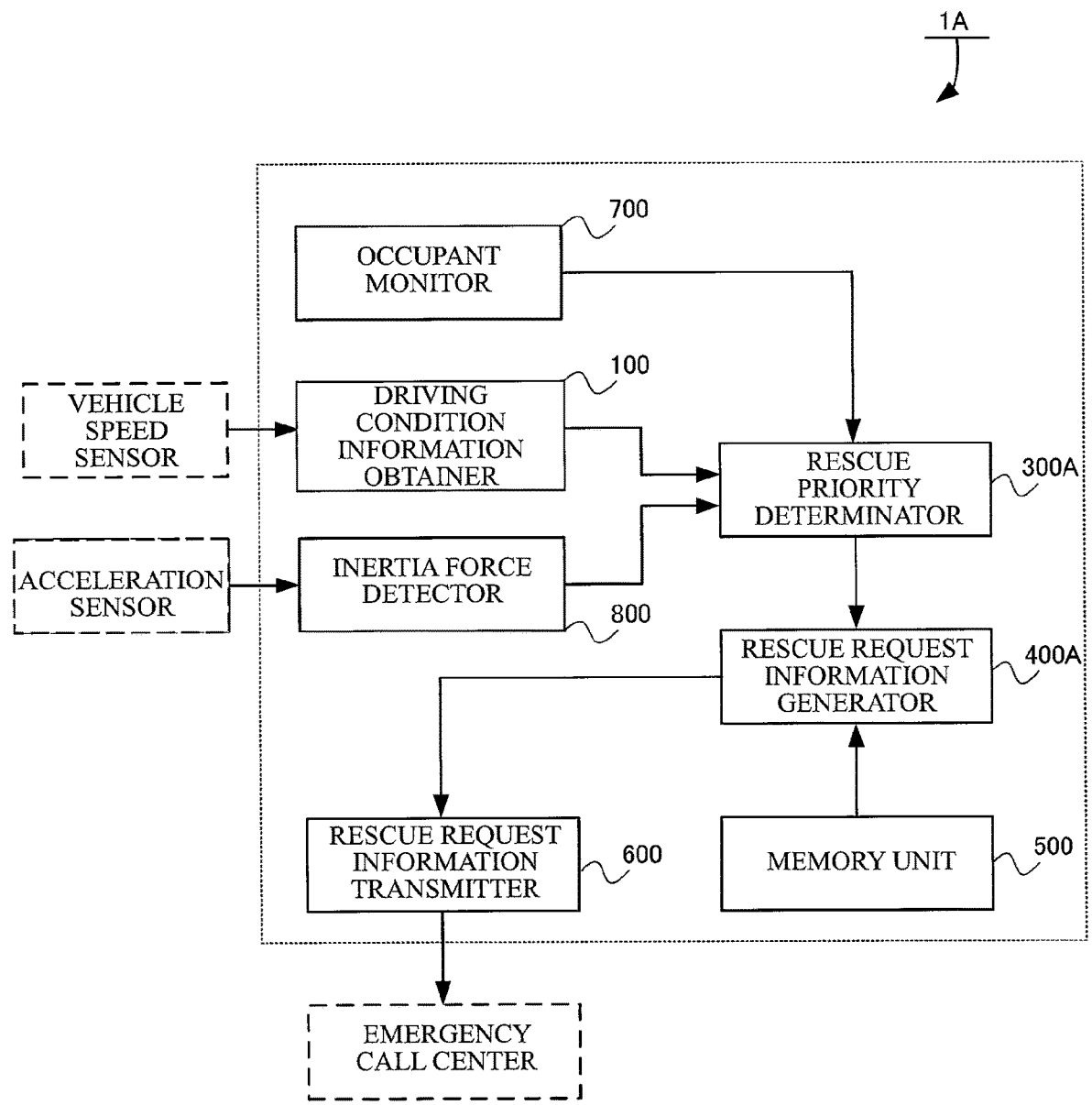
FIG. 8 illustrates a configuration of a rescue priority determination device according to a second embodiment of the disclosure.

As illustrated in FIG. 8, the rescue priority determination device 1A according to this embodiment comprises a driving condition information obtainer 100, a rescue priority determinator 300A, a rescue request information generator 400A, a memory unit 500, a rescue request information transmitter 600, an occupant monitor 700, and an inertia force detector 800.

Detailed descriptions of the components with the same symbols as in the first embodiment are omitted, as they have the same functions.

The rescue priority determinator 300A determines rescue priority level for a vehicle that made the emergency call based on driving condition information of the vehicle obtained by the driving condition information obtainer 100 and inertia force detected by the inertia force detector 800.

For example, if the driving condition information obtained by the driving condition information obtainer 100 indicates that the vehicle which made the emergency call is at a standstill, and the inertia force detector 800 detects inertia force generated when the moving speed of the vehicle changes, the rescue priority determinator 300A determines that the vehicle that made the emergency call is in high need for rescue and raises the rescue priority level.

The rescue priority determinator 300A outputs the determined rescue priority level for the vehicle that made the emergency call to the rescue request information generator 400A, which will be described below.

The rescue request information generator 400A generates rescue request information according to the amount of change in location information of the vehicle that made the emergency call when the rescue priority level determined by the rescue priority determinator 300A is high.

For example, if the generation time of the inertia force generated in the vehicle is longer than a predetermined amount of time (predetermined time), the rescue request information generator 400A generates first rescue request information. Examples of when the first rescue request information is issued includes when the vehicle is determined to be involved in a disaster.

If the generation time of the inertia force generated in the vehicle that made the emergency call is equal to or shorter than the predetermined time, the rescue request information generator 400A generates second rescue request information. Examples of when the second rescue request information includes when the vehicle that made the emergency call is determined to be involved in a multiple collision accident.

The predetermined time is, for example, a threshold value to distinguish between the above-mentioned disaster and multiple collision accident, which is, for example, a value of a few seconds.

The inertia force detector 800 detects the inertia force generated when the moving speed of the vehicle that made the emergency call changes.

In one example, the inertia force detector 800 continuously detects the inertia force generated when the moving speed of the vehicle that made the emergency call changes, for example, using output from an acceleration sensor of the vehicle.

For example, the inertia force detector 800 continuously monitors the output from the acceleration sensor, whereby the inertia force detector 800 can output information on how often and how much inertia force is generated and how long and how much inertia force is generated continuously, etc. to the rescue priority determinator 300A.

Figure 9:
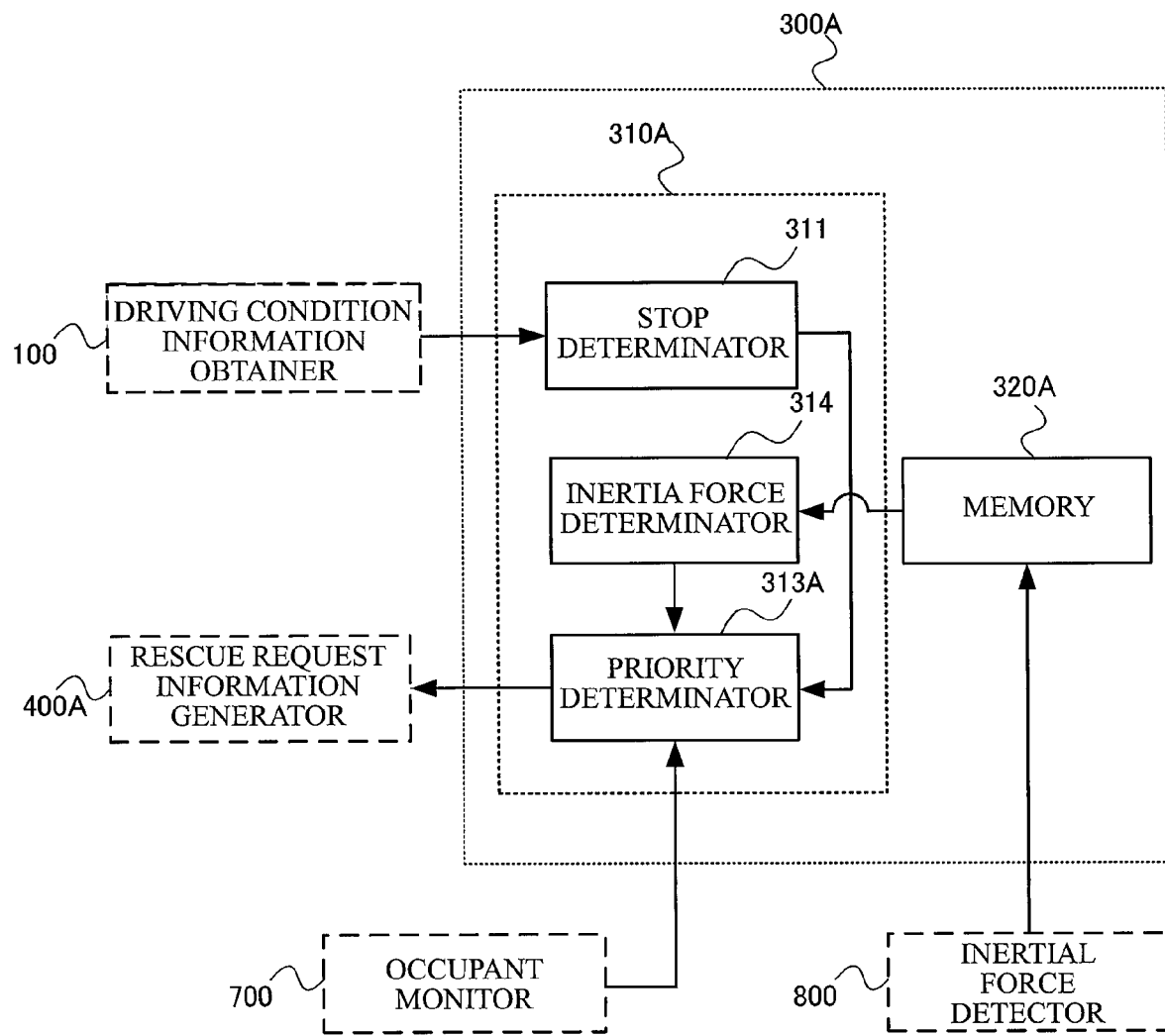
FIG. 9 illustrates the configuration of a rescue priority determinator according to the second embodiment of the disclosure.

As illustrated in FIG. 9, the rescue priority determinator 300A comprises a processor 310A and a memory 320A.

A processor 310A controls the entire rescue priority determinator 300A according to the control program stored in the memory 320A, which is described below.

In addition, in this embodiment, in particular, functions such as a stop determinator 311, a priority determinator 313A, and an inertia force determinator 314, which will be described later, are executed.

The memory 320A includes ROM (Read Only Memory), RAM (Random Access Memory) etc., and the ROM stores the above mentioned control program, etc., and the RAM stores various data, etc.

In this embodiment, the detection information from the inertia force detector 800 is stored in the RAM in chronological order, for example.

As illustrated in FIG. 9, the processor 310A comprises a stop determinator 311, a priority determinator 313A, and an inertia force determinator 314.

Detailed descriptions of the components with the same symbols as in the first embodiment are omitted, as they have the same functions.

The priority determinator 313A determines the rescue priority level based on the determination result by the stop determinator 311, the generation time of the inertia force acting on the vehicle which made the emergency call that is successively input from the inertia force determinator 314 (described below), and the information including information on the presence or absence of the one or more occupants obtained from the occupant monitor 700.

The result of the rescue priority determination by the priority determinator 313A is output to the rescue request information generator 400A.

The inertia force determinator 314 determines the magnitude, generation time, generation frequency, etc. of the inertia force acting on the vehicle that made the emergency call based on the detection information from the inertia force detector 800 stored in the memory 320A.

The determination result by the inertia force determinator 314 is output to the priority determinator 313A.

The process of the rescue priority determination device 1A according to the present embodiment will be described with reference to FIGS. 10 to 14.

Figure 10:
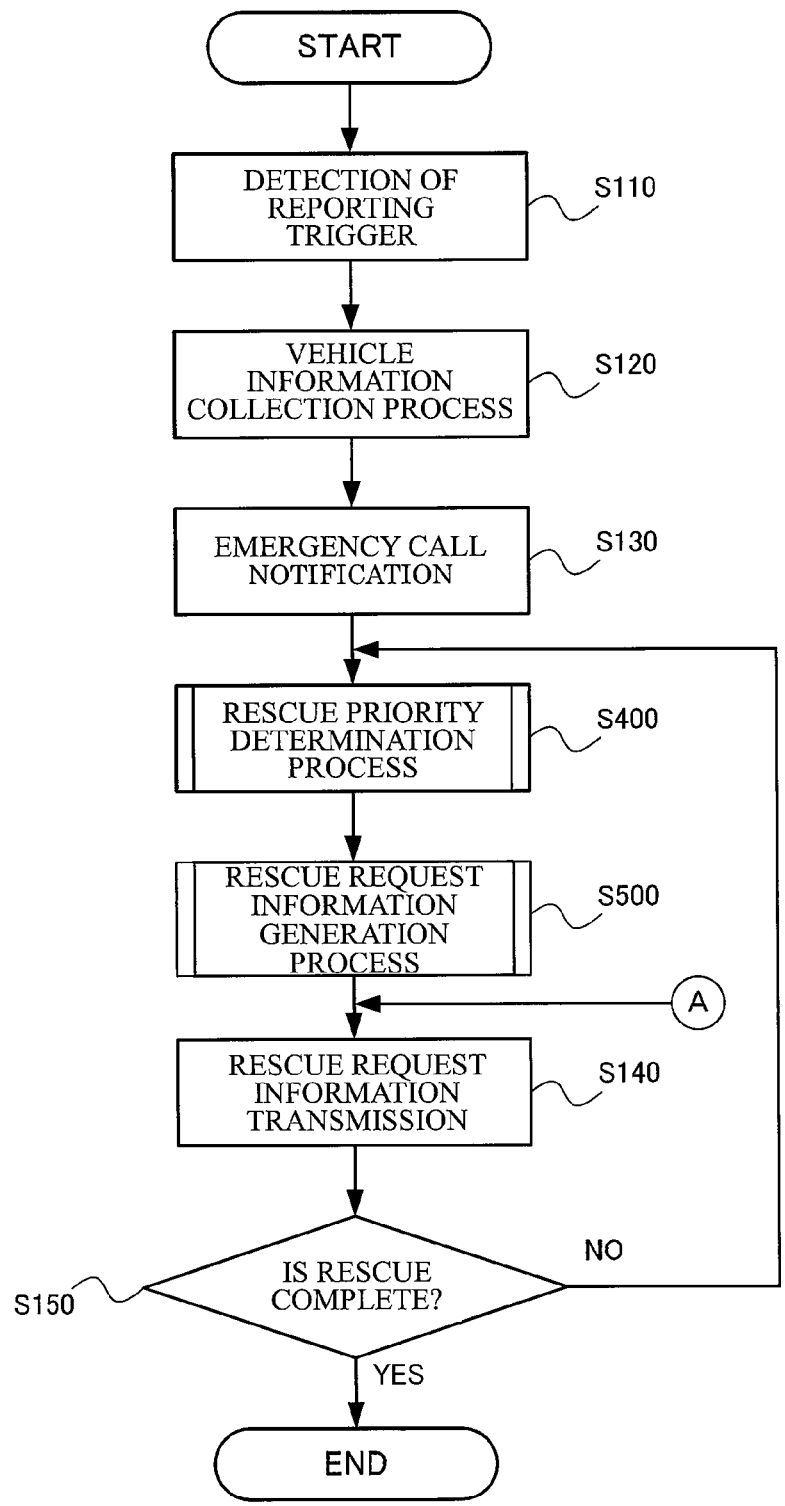
FIG. 10 illustrates a processing flow of the rescue priority determination device according to the second embodiment of the disclosure.

As illustrated in FIG. 10, the rescue priority determination device 1A detects the reporting trigger made automatically or made manually by an occupant of the vehicle (step S110).

For example, in the manual case, the rescue priority determination device 1A detects the reporting trigger by operation of a reporting trigger switch by the one or more occupants. In the automatic case, the rescue priority determination device 1A detects the reporting trigger if a predetermined condition is satisfied.

When the rescue priority determination device 1A detects the reporting trigger, the rescue priority determination device 1A executes the vehicle information collection process to collect vehicle information of the vehicle (step S120).

In one example, the rescue priority determination device 1 collects data from the vehicle speed sensor and information on the inertia force from the acceleration sensor, via the driving condition information obtainer 100 and the inertia force detector 800.

At this time, the rescue priority determination device 1A reports an emergency call, for example, to the emergency call center (step S130).

After reporting the emergency call, the rescue priority determination device 1A periodically collects the vehicle information and continues to transmit the collected vehicle information to, for example, the emergency call center.

Next, the rescue priority determination device 1A executes a rescue priority determination process to determine the rescue priority for the vehicle (step S400).

The details of the rescue priority determination process (step S400) will be described below.

Furthermore, the rescue priority determination device 1A executes a rescue request information generation process to generate rescue request information (step S500).

The details of the rescue request information generation process (step S500) will be described below.

After completing the rescue request information generation process (step S500), the rescue priority determination device 1A transmits the generated rescue request information to, for example, the emergency call center (step S140) and determines whether the rescue is complete (step S150).

If the rescue priority determination device 1A determines that the rescue is complete ("YES" in step S150), the rescue priority determination device 1A terminates the series of processes.

On the other hand, if the rescue priority determination device 1 determines that the rescue has not been completed ("NO" in step S150), the rescue priority determination device 1A moves the process to step S400 to repeat, until the rescue is complete, executing the rescue priority determination process (step S400), and the rescue request information generation process (step S500) based on the vehicle information which is most recently collected, and the process of transmitting the generated rescue request information to the emergency call center (step S140).

The rescue priority determination process in the rescue priority determination device 1A according to the present embodiment will be described with reference to FIGS. 11 and 13.

Figure 11:
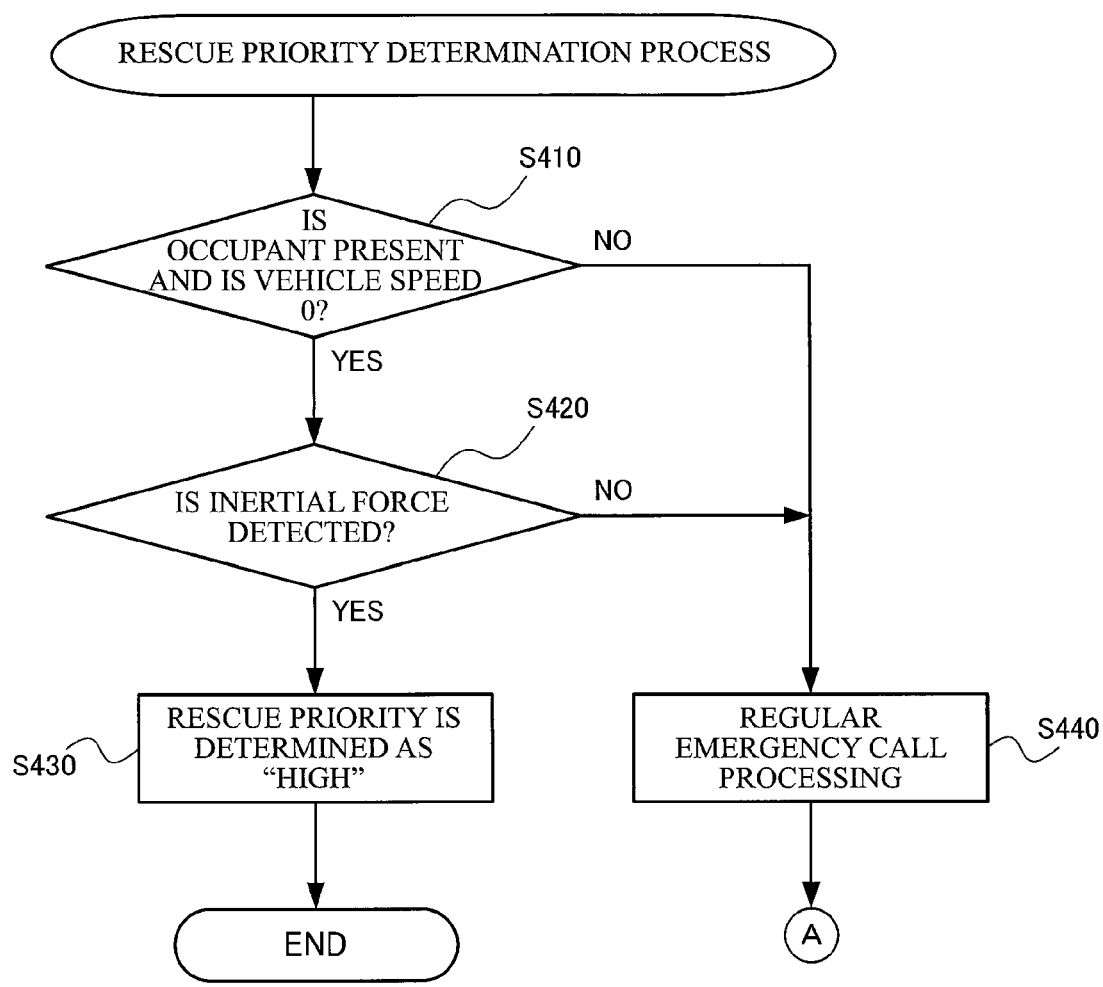
FIG. 11 illustrates a processing flow of a rescue priority determination process in the rescue priority determination device according to the second embodiment of the disclosure.

As illustrated in FIG. 11, the priority determinator 313A determines whether, for example, the one or more occupants are present in the vehicle that made the emergency call and whether the vehicle speed of the vehicle that made the emergency call is zero (step S410), based on the results of the determination by the stop determinator 311 and the information obtained from the occupant monitor 700, including the information on the presence or absence of the one or more occupants.

If the priority determinator 313A determines that the one or more occupants are present in the vehicle and that the vehicle speed of the vehicle is zero ("YES" in step S410), the priority determinator 313A determines whether inertia force has acted on the vehicle based on the information such as the magnitude, generation time, generation frequency, etc. of the inertia force acting on the vehicle that made the emergency call, which is successively input from the inertia force determinator 314 (step S420).

If determining that inertia force has acted on the vehicle that made the emergency call ("YES" in step S420), the rescue priority level is determined to be "high" based on a data table illustrated in FIG. 13, for example, and ends the process (step S430).

The priority determinator 313A outputs the determination result including the rescue priority level linked with the vehicle information to the rescue request information generator 400A, for example, as illustrated in FIG. 13.

On the other hand, if the priority determinator 313A determines that there are the one or more occupants in the vehicle that made the emergency call and that the speed of the vehicle that made the emergency call is not zero ("NO" in step S410), or if determining that there is no inertia force acting on the vehicle ("NO" in step S420), the priority determinator 313A processes the emergency call from the vehicle as a regular emergency call (step S440).

The rescue priority determination device 1A then transitions the process to step S140.

The rescue request information generation process in the rescue priority determination device 1A according to the present embodiment will be described with reference to FIGS. 12 and 14.

Figure 12:
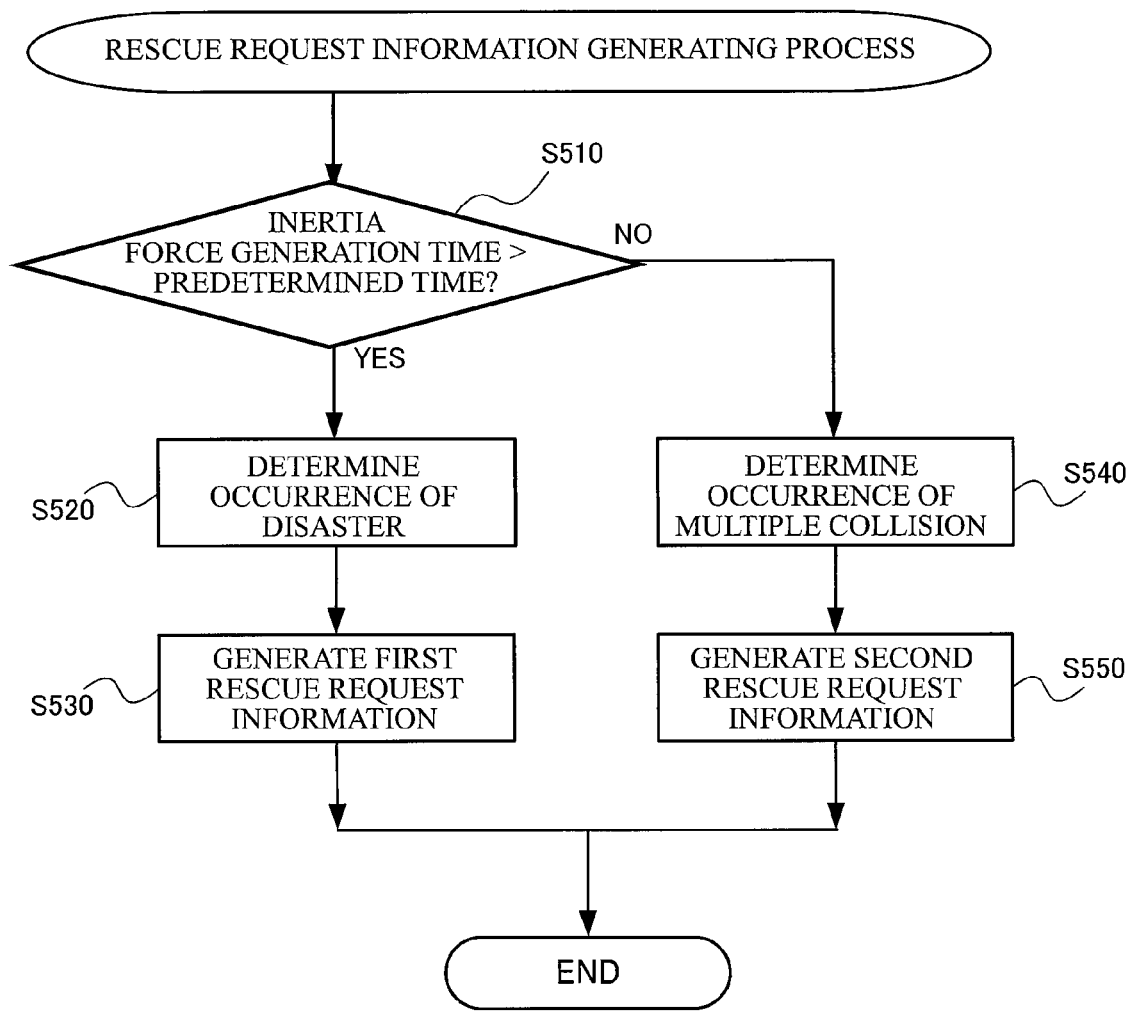
FIG. 12 illustrates a processing flow of a rescue request information generation process in the rescue priority determination device according to the second embodiment of the disclosure.

As illustrated in FIG. 12, the rescue request information generator 400A determines whether the generation time of the inertia force generated in the vehicle that made the emergency call is longer than a predetermined time based on information input from the priority determinator 313A (step S510).

If the rescue request information generator 400A determines, based on the information input from the priority determinator 313A, that the generation time of the inertia force generated in the vehicle that made the emergency call is longer than the predetermined time ("YES" in step S510), the rescue request information generator 400A refers to a database illustrated in FIG. 14, for example, and determines that a disaster has occurred (step S520), and generates first rescue request information (step S530).

The rescue priority determination device 1A then transitions the process to step S140.

On the other hand, if the rescue request information generator 400A determines, based on the information input from the priority determinator 313A, that the generation time of the inertia force generated in the vehicle that made the emergency call is shorter than the predetermined time ("NO" in step S510), the rescue request information generator 400A refers to the database illustrated in FIG. 14, for example, and determines that a multiple collision accident has occurred (step S540), and generates second rescue request information (step S550).

The rescue priority determination device 1A then transitions the process to step S140.

In the database illustrated in FIG. 14, the vehicle information and the rescue request information are linked, and the rescue request information includes the rescue priority level, accident type, and rescue organization information.

As explained above, the rescue priority determination device 1A according to this embodiment comprises the driving condition information obtainer 100 that acquires driving condition information of the vehicle that made the emergency call, the inertia force detector 800 that detects the inertia force generated when the moving speed of the vehicle that made the emergency call changes, and the rescue priority determinator 300A that determines the rescue priority level for the vehicle that made the emergency call based on the driving condition information obtained by the driving condition information obtainer 100 and the inertia force detected by the inertia force detector 800.

If the vehicle that made the emergency call is at a standstill and inertia force generated when the moving speed of the vehicle that made the emergency call changes is detected, the rescue priority determinator 300A determines that the vehicle that made the emergency call is in high need of rescue and raises the rescue priority level for the vehicle.

In other words, if the vehicle that made the emergency call is at a standstill and the inertia force that occurs when the moving speed of the vehicle that made the emergency call changes is detected, it is highly likely that the vehicle that made the emergency call was involved in some kind of accident or disaster.

Therefore, when the driving condition of the vehicle which made the emergency call is at a standstill and inertia force generated when the moving speed of the vehicle changes is detected, the rescue priority determinator 300A determines that the vehicle is in high need of rescue and raising the rescue priority. Accordingly, the rescue priority level can determined based on the condition of the vehicle with objective information of the vehicle.

The driving condition information obtainer 100 in the rescue priority determination device 1A according to this embodiment obtains the driving condition information of the vehicle that made the emergency call from the vehicle speed sensor, and the rescue priority determinator 300A determines that the vehicle that made the emergency call is at a standstill when the information from the vehicle speed sensor indicates that the vehicle speed of the vehicle is zero.

In other words, even if a foot brake or a side brake of the vehicle is determined to be activated, it is not necessarily possible to accurately determine whether there is a change in the location of the vehicle that made the emergency call based solely on external force from outside of the vehicle that made the emergency call.

That is, by detecting that the vehicle speed is zero using information from the vehicle speed sensor, it is possible to clearly detect that there are a change in the location of the vehicle and a change in location due to the external force.

The rescue priority determination device 1A according to this embodiment includes the occupant monitor 700 that monitors the one ore more occupants in the vehicle that made the emergency call. When the vehicle is at a standstill and inertia force generated when the moving speed of the vehicle that made the emergency call changes is detected, and when the one or more occupants are detected in the vehicle that made the emergency call, the rescue priority determinator 300A determines that the vehicle is in high need of rescue and raises the rescue priority for the vehicle.

In other words, detecting the presence or absence of the one or more occupants by the occupant monitor 700 in a situation where there is a high possibility that the vehicle that made the emergency call is involved in some kind of accident or disaster allows a more accurate determination of the need for rescue.

If the occupant monitor 700 is configured of an imaging device or millimeter wave radar etc., the occupant monitor 700 can also detect as the behavior and vital data etc., of the occupant in the vehicle, thereby further enabling accurate determination of the urgency of the rescue.

The rescue priority determination device 1A according to this embodiment includes the rescue request information generator 400A and the rescue request information transmitter 600. The rescue request information generator 400A generates the rescue request information according to the generation time of the inertia force generated in the vehicle that made the emergency call when the rescue priority determined by the rescue priority determinator 300A is high. The rescue request information transmitter 600 transmits the rescue request information generated by the rescue request information generator 400A to the emergency call center. The rescue request information generator 400A generates the first rescue request information when the generation time of the inertia force generated in the vehicle is longer than the predetermined time, and generates the second rescue request information when the generation time of the inertia force is shorter than the predetermined time.

In other words, if the rescue priority determined by the rescue priority determinator 300A is high and the generation time of inertia force generated in the vehicle that made the emergency call is longer than the predetermined time, the vehicle is likely to be involved in a disaster etc. Accordingly, the rescue request information generator 400A generates the first rescue request information to request rescue to, for example, the fire department which is the appropriate organization to which the general public can request rescue. If the rescue priority determined by the rescue priority determinator 300A is high and the generation time of inertia force generated in the vehicle is shorter than the predetermined time, the vehicle which made the emergency call is likely involved in a multiple collision or other accident. Accordingly, the rescue request information generator 400 generates the second rescue request information to request rescue to, for example, the police which is the most appropriate organization to which the general public can request rescue.

Therefore, it is possible to determine the rescue priority based on the condition of the vehicle determined with objective information of the vehicle, and to request rescue to the appropriate rescue organization.

Since the inertia force determinator 314 detects the frequency of occurrence of inertia force, it is possible to estimate, based on the frequency of occurrence, how many vehicles are involved in a multiple collision accident involving the vehicle that made the emergency call.

And when the number of vehicles involved in the multiple collision is large, not only the police but also the fire department can be included as the most appropriate rescue requesting organization, since a possibility of a vehicle fire increases.

The example of obtaining the amount of change in the location information of the vehicle that made the emergency call obtained by the location information obtainer 200, and the second embodiment utilizes the magnitude, generation time, frequency, etc. of the inertia force acting on the vehicle obtained by the inertia force detector 800, the disclosure can be applied to a configuration that utilizes the amount of change in the location information of the vehicle and the magnitude, generation time, frequency, etc. of the inertia force acting on the vehicle.

In the above configuration, it is possible to estimate the extent of a disaster or multiple collision accident by analyzing the extent to which the location information of the vehicle that made the emergency call changes as a result of how much, how long or how often inertia force is applied to the vehicle.

In the first and second embodiments, the location of the rescue priority determinator 300 and the location of the rescue priority determinator 300A are not particularly limited. The rescue priority determinator 300 and the location of the rescue priority determinator 300A may be placed in an emergency call center or emergency call server, as well as on the vehicle side.

For example, the rescue priority determinator 300 may be placed at the emergency call center or emergency call server, receive driving condition information, location information, occupant information, etc. which are transmitted from the vehicle, determine the rescue priority level for the vehicle on the emergency call center or emergency call server side based on the received information, and select an rescue requesting organization according to the determination.

The rescue priority determination device 1 can be realized by recording the processes of the rescue priority determinator 300 and the rescue priority determinator 300A in a recording medium readable by a computer system, and, by causing a program recorded in the recording medium to be read and executed by the rescue priority determinator 300 or the rescue priority determinator 300A. The computer system as used herein may include an operating system and hardware such as peripheral devices.

In the case with an use of WWW (World Wide Web) system, the computer system also includes an environment that provides and/or displays a website. The program may be transmitted from the computer system storing the program in the storage device or the like to another computer system, via a transmission medium or by a transmission wave in the transmission medium. The transmission medium through which the program is transmitted may be a medium having a function of transmitting information. Here the transmission medium that transmits the program refers to a medium configured to transmit data, e.g., a network (communication network) such as the Internet and a communication channel (communication line) such as a telephone line.

The program may implement some of the aforementioned functions. Furthermore, the program may be a so-called difference file (difference program) that can implement the aforementioned functions in combination with a program already recorded in the computer system.

Although the embodiments of the present disclosure have been described in detail with reference to the drawings, the specific configuration is not limited to this embodiment, and includes designs and the like within a range that does not deviate from the gist of the present disclosure.

APPENDICES

Appendix 1

A rescue priority determination device comprising:
a driving condition information obtainer configured to obtain driving condition information of a vehicle that made the emergency call;
an inertia force detector configured to detect inertia force generated when a moving speed of the vehicle changes; and
a rescue priority determinator configured to determine the priority for the vehicle based on the driving condition information obtained by the driving condition information obtainer and the inertia force detected by the inertia force detector, wherein
the rescue priority determinator comprises one or more processors and one or more memories communicably coupled to the one or more processors, and
the one or more processors are configured to determine that the vehicle that made the emergency call is in high need of rescue for the vehicle that made the emergency call and raise the rescue priority level based on determining that the vehicle that made the emergency call is at a standstill and that the inertia force is detected.

Appendix 2

The rescue priority determination device according to appendix 1, wherein the driving condition information obtainer is configured to obtain the driving condition information of the vehicle from a vehicle speed sensor of the vehicle, and the one or more processors are configured to determine that the vehicle that made the emergency call is at the standstill when the driving condition information from the vehicle speed sensor indicates that a vehicle speed of the vehicle is zero.

Appendix 3

The rescue priority determination device according to appendix 1 or 2, further comprising
an occupant monitor configured to monitor an occupant in the vehicle, wherein
the one or more processors determine that the vehicle that made the emergency call is in high need of rescue and raise the rescue priority level based on determining that the vehicle that made the emergency call is at the standstill, that the inertia force generated when the moving speed of the vehicle that made the emergency call changes is detected, and that the occupant is detected in the vehicle.

Appendix 4

The rescue priority determination device according to appendix 3, further comprising:
a rescue request information generator configured to generate rescue request information according to generation time of the inertia force in a case where the rescue priority level determined by the rescue priority determinator is high;
a rescue request information transmitter configured to transmit the rescue request information generated by the rescue request information generator to an emergency call center, wherein
the rescue request information generator generates first rescue request information in a case where the generation time of the inertia force is longer than a predetermined time, and generates second rescue request information in a case where the generation time of inertia force is shorter than the predetermined time.

Appendix 5

The rescue priority determination device according to appendix 4, wherein the first rescue request information is a rescue request information that at least requires a request to a fire department.

Appendix 6

The rescue priority determination device according to appendix 4, wherein the second rescue request information is a rescue request information that at least requires a request to a police department.

Appendix 7

A rescue priority determination device characterized in that the determinator determines that it is the rescue priority requiring the first rescue request if the change in the location information of the vehicle that made the emergency call is greater than the predetermined change, and determines that it is the rescue priority requiring the second rescue request if the change in the location information of the vehicle that made the emergency call is smaller than the predetermined change.

The invention claimed is:

1. A rescue priority determination device comprising:
one or more processors; and
one or more memories storing instructions causing the one or more processors to, after a report of an emergency having been triggered for a vehicle:
obtain driving condition information of the vehicle from a wheel speed sensor of the vehicle that is configured to detect a rotation speed of a wheel of the vehicle;
obtain location information of the vehicle from a global positioning system (GPS);
determine rescue priority level for the vehicle based on the obtained driving condition information and the obtained location information of the vehicle, wherein
the one or more processors are configured to:
determine that the vehicle is in high need of rescue and has a high rescue priority level, based on determining that
(i) the rotation speed of the wheel of the vehicle is substantially zero;
(ii) there has been a change in the location information of the vehicle; and
in response to determining that the vehicle is in the high need of rescue, generate and transmit rescue request information, causing the rescue request information to be sent to an organization.

2. The rescue priority determination device according to claim 1, further comprising
an occupant monitor configured to monitor an occupant in the vehicle, wherein
the one or more processors are configured to determine that the vehicle is in high need of rescue based on determining that the rotation speed of the vehicle is substantially zero, that the location information of the vehicle undergoes a change, and that the occupant is detected in the vehicle.

3. The rescue priority determination device according to claim 2, wherein the one or more processors are further configured to:
generate the rescue request information according to an amount of the change in the location information of the vehicle in a case where the rescue priority level is high; and
transmit the rescue request information to an emergency call center, wherein
the one or more processors are configured to:
generate a first rescue request information in a case where the amount of the change in the location information is greater than a predetermined amount, and
generate a second rescue request information in a case where the amount of the change in the location information is smaller than or equal to the predetermined amount.

4. The rescue priority determination device according to claim 1, wherein the rescue priority determination device is located at an emergency call center.

5. The rescue priority determination device according to claim 1, wherein the rescue priority determination device is located at the vehicle.

6. The rescue priority determination device according to claim 1, wherein the one or more processors are further configured to:
  iteratively obtain the driving condition information and the location information of the vehicle, and determine the rescue priority level for the vehicle; and
  generate and transmit an updated rescue request information in response to a change in the determined rescue priority level of the vehicle.

7. The rescue priority determination device according to claim 1, wherein the rescue request information comprising rescue priority, accident type, and rescue organization information.

8. A rescue priority determination device comprising:
  one or more processors; and
  one or more memories storing instructions for causing the one or more processors to, after a report of an emergency having been triggered for a vehicle;
    obtain driving condition information of the vehicle from a wheel speed sensor of the vehicle that is configured to detect a rotation speed of a wheel of the vehicle;
    detect inertia force generated when a moving speed of the vehicle changes; and
    determine rescue priority level for the vehicle based on the obtained driving condition information and the detected inertia force, wherein
  the one or more processors are configured to:
    determine that the vehicle is in high need of rescue and has a high rescue priority level, based on determining that
      (i) the rotation speed of the wheel of the vehicle is substantially zero;
      (ii) the inertia force generated when the moving speed of the vehicle is changing has been detected; and
    in response to determining that the vehicle is in the high need of rescue, generate and transmit rescue request information, causing the rescue request information to be sent to an organization.

9. The rescue priority determination device according to claim 8, wherein the one or more processors are further configured to:
  detect the inertia force generated when the moving speed of the vehicle changes based on an output from an acceleration sensor of the vehicle.

10. The rescue priority determination device according to claim 8, further comprising
  an occupant monitor configured to monitor an occupant in the vehicle, wherein
  the one or more processors are configured to determine that the vehicle is in high need of rescue based on determining that the rotation speed of the vehicle is substantially zero, that the inertia force has been detected, and that the occupant is detected in the vehicle.

11. The rescue priority determination device according to claim 9, further comprising
  an occupant monitor configured to monitor an occupant in the vehicle, wherein
  the one or more processors are configured to determine that the vehicle is in high need of rescue based on determining that the rotation speed of the vehicle is substantially zero, that the inertia force has been detected, and that the occupant is detected in the vehicle.

12. The rescue priority determination device according to claim 10, wherein the one or more processors are further configured to:
  generate the rescue request information according to a generation time of the inertia force generated in the vehicle in a case where the rescue priority level is high; and
  transmit the rescue request information to an emergency call center, wherein
  the one or more processors are configured to:
  generate a first rescue request information in a case where the generation time of the inertia force generated in the vehicle is longer than a predetermined time, and
  generate a second rescue request information in a case where the generation time of the inertia force generated in the vehicle is shorter than or equal to the predetermined time.

13. The rescue priority determination device according to claim 11, wherein the one or more processors are further configured to:
  generate the rescue request information according to a generation time of the inertia force generated in the vehicle in a case where the rescue priority level is high; and
  transmit the rescue request information to an emergency call center, wherein
  the one or more processors are configured to:
  generate a first rescue request information in a case where the generation time of the inertia force generated in the vehicle is longer than a predetermined time, and
  generate a second rescue request information in a case where the generation time of the inertia force generated in the vehicle is shorter than or equal to the predetermined time.

14. The rescue priority determination device according to claim 8, wherein the rescue priority determination device is located at an emergency call center.

15. The rescue priority determination device according to claim 8, wherein the rescue priority determination device is located at the vehicle.

16. The rescue priority determination device according to claim 8, wherein the one or more processors are further configured to:
  iteratively obtain the driving condition information and the inertia force, and determine the rescue priority level for the vehicle; and
  generate and transmit an updated rescue request information in response to a change in the determined rescue priority level of the vehicle.

17. The rescue priority determination device according to claim 8, wherein the rescue request information comprising rescue priority, accident type, and rescue organization information.

* * * * *